March 30, 1948. B. F. BOWER 2,438,600
TRANSFER DEVICE FOR TUBE AND ROD CHUCKS
Filed Feb. 23, 1945 4 Sheets-Sheet 1
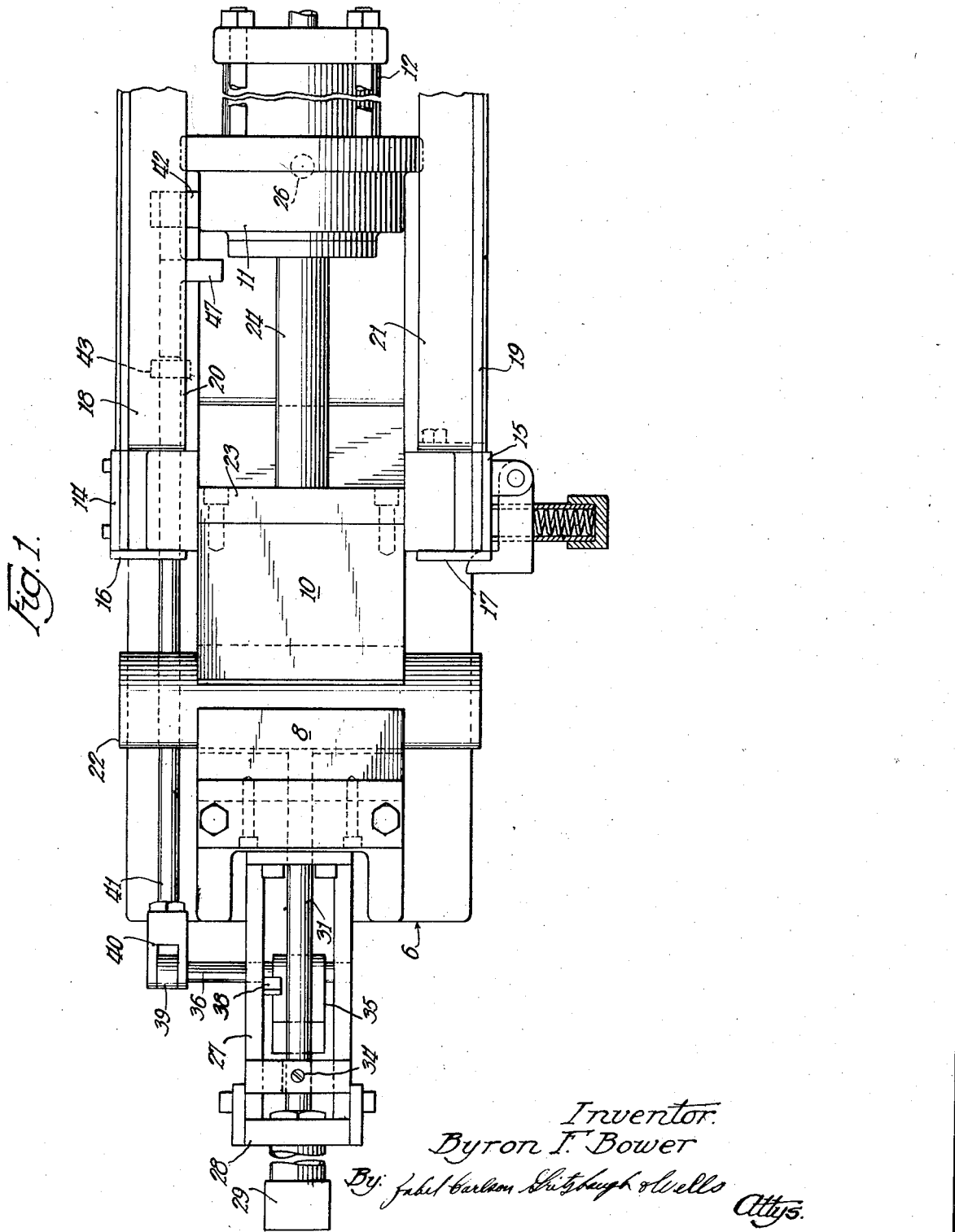
Inventor.
Byron F. Bower

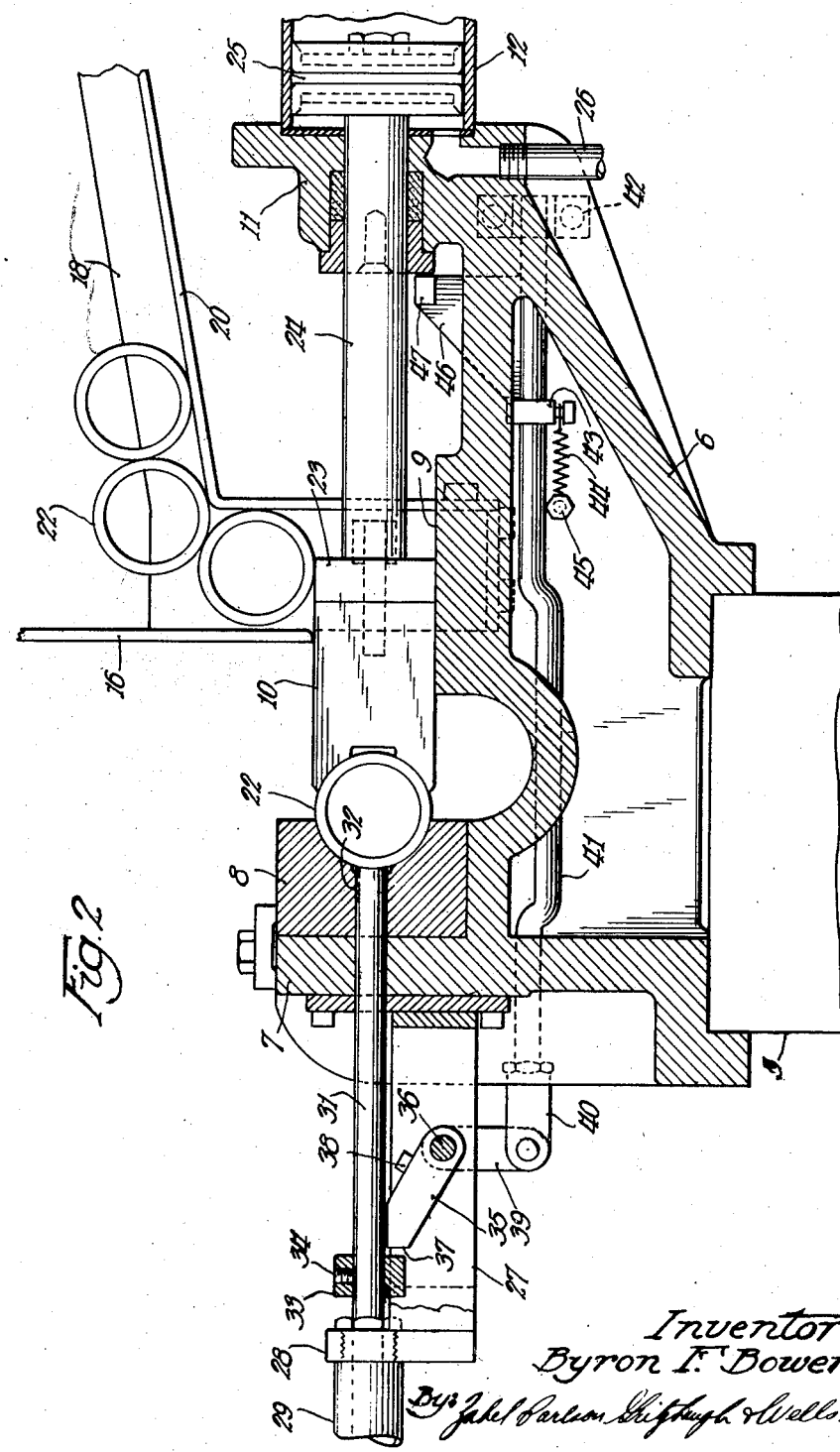

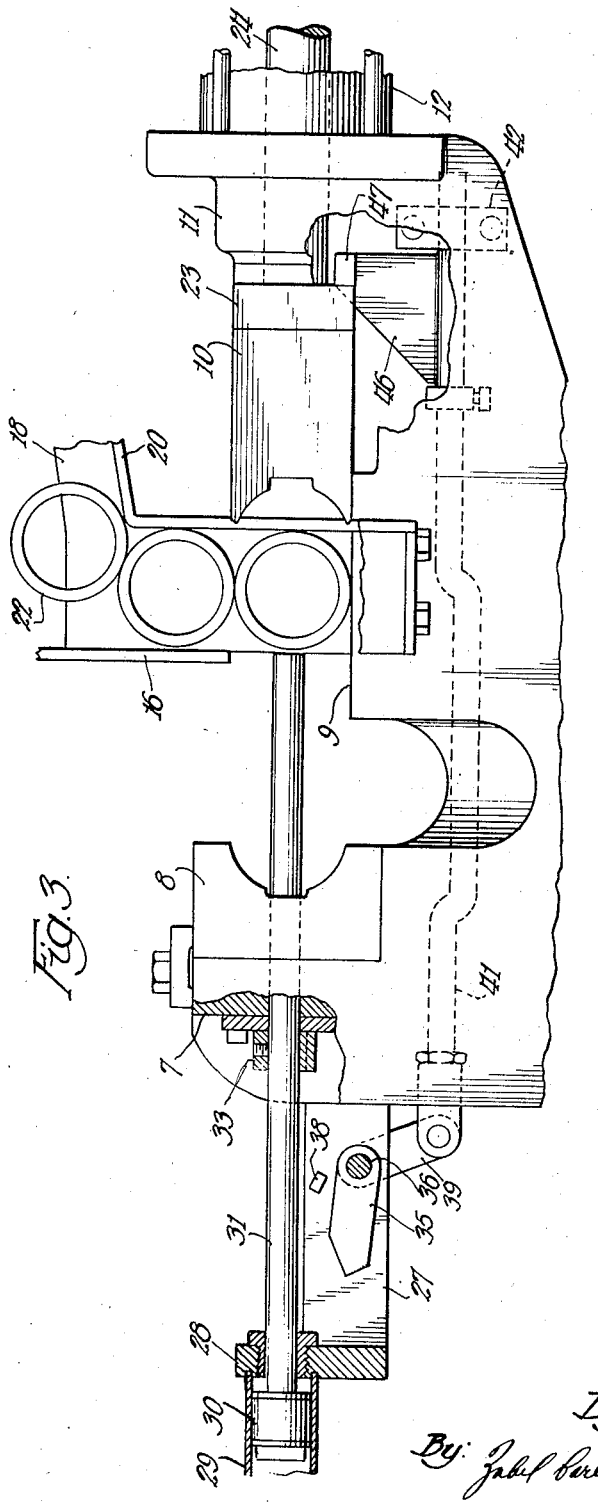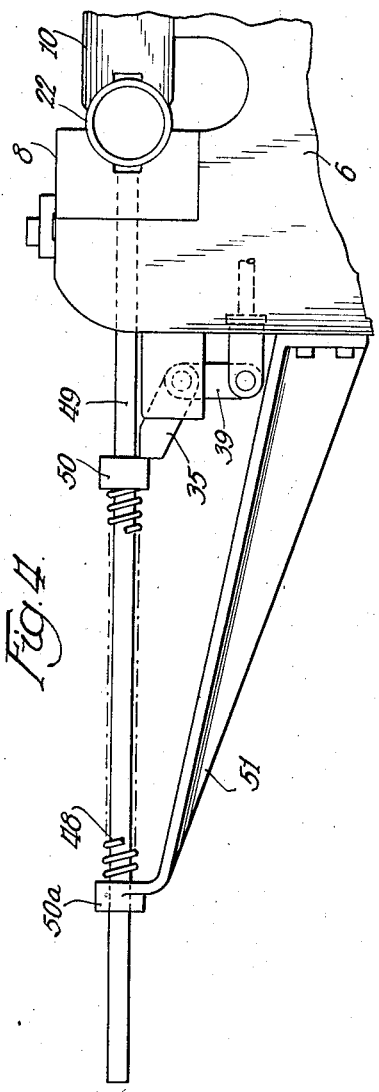

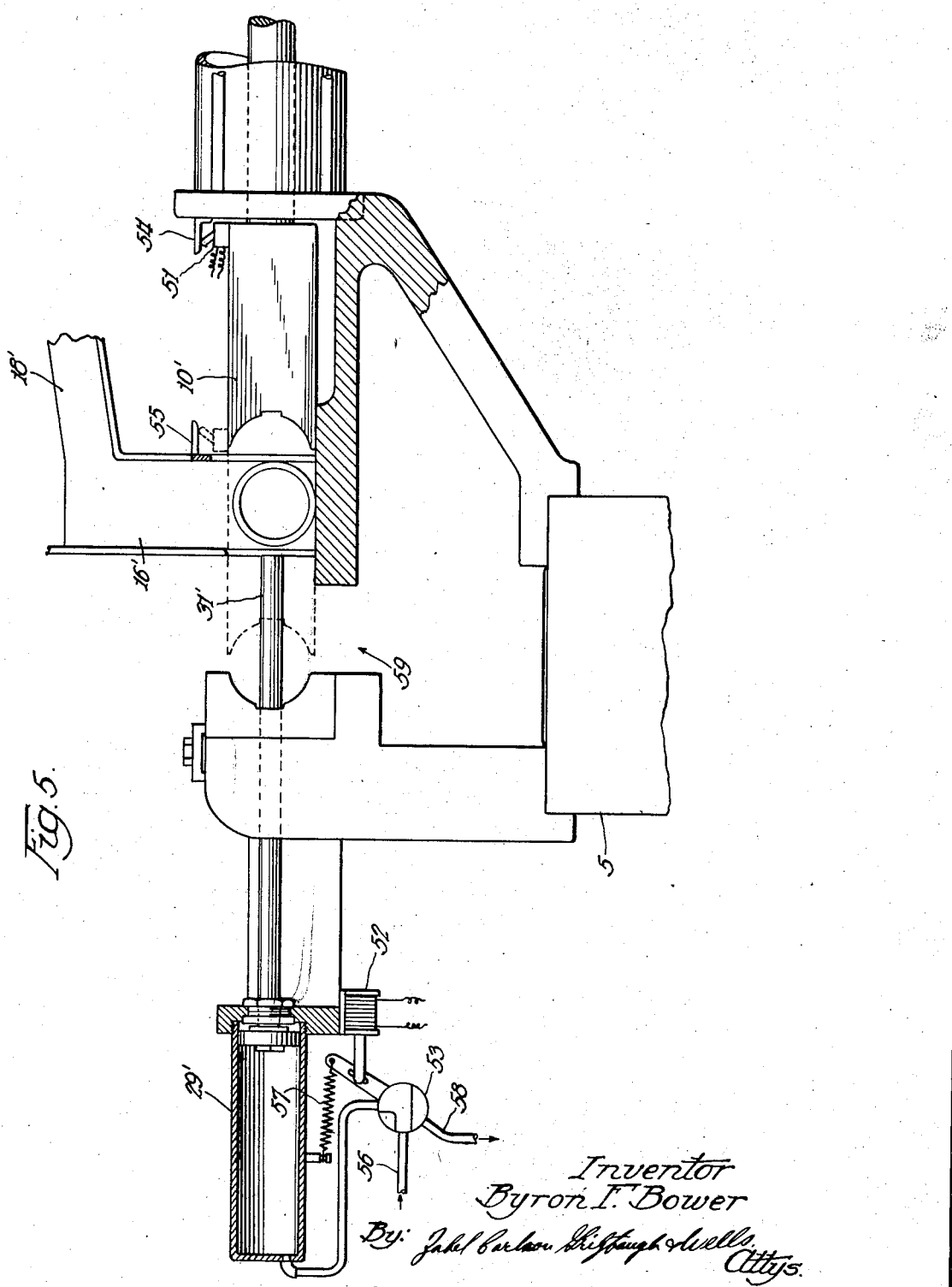

Patented Mar. 30, 1948

2,438,600

UNITED STATES PATENT OFFICE 2,438,600

TRANSFER DEVICE FOR TUBE AND ROD CHUCKS

Byron F. Bower, Aurora, Ill., assignor to Pines Engineering Company, Aurora, Ill.

Application February 23, 1945, Serial No. 579,449

6 Claims. (Cl. 29—60)

1

The present invention relates to work holding devices particularly adapted to hold rods, tubes and the like in position so that one or more tools can be engaged with the work while it is held. It is the principal purpose of this invention to provide a novel combination whereby work being fed to the chucks is held against one jaw of the chuck while that jaw advances the work into engagement with the other jaw. This construction withholds the transfer finger long enough to allow the work to drop in place in the chuck jaw.

It is also the purpose of my invention to provide a work holder wherein a moveable chuck jaw serves as a support for the articles to be fed to the chuck until that jaw is retracted and a transfer device acts to clamp the work to the moveable jaw when it is retracted, the transfer device being operated also to kick the work out of the other chuck jaw.

The nature and advantages of my invention will appear more fully from the following description and the accompanying drawings wherein a preferred form of the invention is discussed. It should be understood, however, that the drawings and description are illustrative only and are not to be taken as limiting the invention except insofar as it is limited by the claims.

In the drawings:

Figure 1 is a plan view of a work holding device embodying my invention;

Figure 2 is a longitudinal sectional view through the device;

Figure 3 is a view in side elevation of the work holding device, certain parts being shown in section and other parts being broken away to illustrate details of construction that would otherwise be hidden;

Figure 4 is a fragmentary view in side elevation of a slightly modified form of the invention; and Figure 5 is a side view partly in section showing a modification of the control means for the work holding device.

Referring now to the drawings, the present invention is embodied in a work holding device which is adapted to receive and hold pieces of rods, tubing and the like while they are subjected to work operations by one or more tools. The tools for example, may be reaming tools, champfering tools and the like. The machine embodies a supporting base 5 (see Figure 2) on which a main work holding bed 6 is mounted. The work holding bed is desirably a casting having a raised head 7 recessed to receive a stationary chuck jaw 8. The bed has a platform 9

2 slidably receiving a removable chuck jaw 10. The casting is also formed with a head 11 for one end of a cylinder 12. The casting 6 is formed with a transversably running angularly disposed trough 13 into which the articles are discharged from the chuck jaws.

The platform 9 serves as a mounting base for a construction that provides a work receiving trough. This construction includes two upstanding side pieces 14 and 14 (see Figure 1). The pieces 14 and 15 are bolted to the platform 9. The piece 14 has a plate 16 welded thereto and extending inwardly at right angles thereto. The piece 15 has a plate 17 welded thereto and extending inwardly at right angles thereto. The plates 16 and 17 extend downwardly only to the level of the top of the chuck jaw 10. Angle irons 18 and 19 are connected with the platform 9. Their flanges 20 and 21 provide sloping supports along which work pieces 22 can be directed down onto the top surface of the chuck jaw 10 and held there while the jaw is in the position shown in Figure 2 of the drawings.

The chuck jaw 10 is removably connected to a head 23 on a piston rod 24 which extends through the head 11 into the cylinder 12 where it is provided with a piston 25. Suitable connections, one of which is shown at 26 are used to supply fluid to the cylinder 12 to advance and retract the piston rod and the chuck jaw 10. It will be noted from Figure 3 that when the chuck jaw 10 is retracted the work pieces 22 can feed down onto the platform 9 in advance of the chuck jaw 10. The plates 16 and 17 terminate above the chuck jaw so that a work piece can advance with the chuck jaw 10 into engagement with jaw 8.

My invention concerns itself primarily with the means of controlling the work piece from the time the chuck jaw 10 is retracted far enough to enable the work piece to drop in front of it until the chuck jaws are closed on the work. The casting 6 has a bracket 27 fixed to the face of the jaw support 7 and extending outwardly to provide a mounting head 28 for a cylinder 29. The cylinder 29 has a piston 30 therein and a rod 31 extends through the head 28 and forwardly through the support 7 and through a central opening 32 in the jaw 8. This rod 31 constitutes a transfer finger and a knockout finger by which the work pieces 22 can be held against the jaw 10 as it advances, and then knocked out of the jaw 8, after the operations have been performed thereon. Any fluid pressure can be used to operate the piston 30. For example, a connection not shown, to a source of air under pressure may be made for the cylinder 29.

In order to control the operation of the rod 31, I provide a collar 33. This collar is adjustable on the rod by means of a set screw 34. A pawl 35 is fixed on a shaft 36 which extends through the bracket 27 and is rotatable therein. The pawl has an end face 37 to engage the collar 33. There is a stop 38 on the bracket 27 to limit the upward movement of the pawl 35, the collar 33 being cut away so that it can pass the stop 38 when the pawl 35 is pulled down as shown in Figure 3 of the drawings.

The shaft 36 is connected by a depending lever arm 39 to a cross head 40 on an end of a trip rod 41. The trip rod 41 has its other end journaled in a bracket 42 on the casting 6 so that the trip rod can slide endwise far enough to move the pawl between the two positions shown in Figures 2 and 3. A collar 43 is fastened on the trip rod. The collar is connected by a spring 44 to a pin 45 on the casting 6 so that the spring 44 tends to pull the trip rod 41 to the left as shown in Figure 2 and thus hold the pawl 35 against the stop 38. The trip rod has a plate 46 welded thereto. This plate is provided with a lug 47 that extends inwardly into the path of the head 23 that supports the chuck jaw 10.

In order that the device may be fully understood, the detailed operation will now be described. Assuming that the parts are in position as shown in Figures 1 and 2, and the work piece is finished, fluid will be let into the cylinder 12 through the connection 26 to retract the jaw 10. There is continuous pressure applied to the piston 30 and the cylinder 29 so that initially as the jaw 10 is retracted, the rod 31 advances to knock the work piece out of the jaw 8. This advance is very short being only the distance between the collar 33 and the face 37 of the pawl 35 as shown in Figure 2 of the drawings. After the collar 33 engages the pawl 35, the rod 31 remains stationary while the jaw 10 moves back almost to the position shown in Figure 3, then the head 23 engages the trip lug 47 and starts to move the trip rod 41 in a direction to release the pawl 35 from the collar 33 as a new work piece 22 falls into position in front of the jaw 10. In this critical interval the trip rod 41 causes the pawl to release the rod 31 and the rod 31 shoots forward until the collar 33 reaches the position shown in Figure 3. The rod 31 is advanced soon enough to prevent the work piece from rolling out of the trough. When the fluid is reversed in the cylinder 12 to again advance the piston 25, the jaw 10 is again advanced to engage the work piece and the rod 31 is pushed back by the jaw 10 while the work piece is carried forward. The pressure of the rod 31 against the work piece is adequate to hold the work in position during this transfer period. Of course, as soon as the collar 33 has moved far enough back, the trip rod 41 sets the pawl 35 into position as shown in Figure 2.

The construction shown in Figure 4 is essentially the same as that shown in Figures 1, 2 and 3 with the exception that the transfer finger is advanced by a spring 48. The transfer finger comprises a rod 49 which extends through the support 7 and the jaw 8. This rod 49 has a collar 50 thereon which serves both as a stop for the pawl 35 and as a stop for one end of the spring 48. A bracket 51 is mounted on the casting 6 and extends away from the casting a substantial distance where it is provided with a bearing 50a for the rod 49. The bearing also serves as a stop for the spring 48. The spring is under compression sufficient to advance the rod in the same manner that the rod 31 is advanced.

The foregoing description is believed to show that the rod 31 constitutes a transfer finger by which work is held against the advancing jaw 10 from the time it reaches the discharged position from the feed trough until the work is engaged in the opposite jaw 8. It is not essential that the jaw 8 be stationary, although it is so shown. The transfer finger performs the additional function of forcing the work out of the jaw 8 in case there is a tendency for it to stick.

In the form of the invention shown in Figure 5 of the drawings the transfer finger 31' is controlled in its movements by the actuation of an electrical device rather than by the mechanical trip means of the main form. In the modified device a limit switch 51 on the moveable jaw 10' controls the energizing of a solenoid 52 which in turn operates a valve 53 to control the supply of fluid under pressure to the cylinder 29'. Two stops 54 and 55 serve to snap the switch from closed to open circuit position and back again as the jaw 10' is retracted and advanced. The arrangement is such that, when the switch 51 approaches the stop 54 the jaw 10' is clearing the chute 16' to allow a piece of tubing to drop into position to be advanced. When the switch 51 is actuated by the stop 54 it energizes the solenoid 52 which causes the valve 53 to connect a supply pipe 56 to the cylinder 29'. This advances the transfer finger 31' to the position shown in Figure 5. Now as the jaw 10' moves to advance a piece of tubing the finger 31' holds the tubing in the jaw 10' and is pushed back against the pressure of the fluid in the cylinder 29'. When the limit switch reaches the stop 55 it is opened to deenergize the solenoid 52 and the valve 53 is moved by a spring 57 to position to cut off the supply pipe 56 from the cylinder 29' and to connect a drain pipe 58 to the cylinder.

When the jaw 10' is withdrawn the switch 51 remains open so the valve 53 remains closed and the transfer finger 31' remains stationary in retracted position until the limit switch reaches the stop 54. At this time the switch is closed and the transfer finger is advanced. If the tubing sticks in the stationary die the finger will knock it out and move on into position to hold the next piece of tubing against the advancing jaw 10'.

For some purposes the chute 13 is not desirable. It is preferable to just let the pieces drop into the machine base. The modified form of the invention shown in Figure 5 is provided with an opening at 59 instead of the chute 13.

Having thus described my invention, I claim:

1. A chucking device including two jaws adapted to clamp articles such as tubes, rods, etc. therebetween, means adjacent one of said jaws for directing articles to the device, the jaw being moveable between a retracted position, where the work may be placed in front of it, and advanced position, where it cooperates with the other jaw to clamp the article, a transfer finger moveable along the path of movement of said jaw between a position holding the article in said jaw as the jaw starts to advance the article and a retracted position where the article held by it is confined between both jaws, means to advance and retract said first named jaw, means urging said transfer finger toward its first named position, a latch holding said finger in retracted position and trip means operable to release the latch at about the time the first named jaw arrives at retracted position whereby to cause the finger to advance and hold an article in the jaw.

2. A chucking device including two jaws adapted to clamp articles such as tubes, rods, etc. therebetween, means adjacent one of said jaws for directing articles to the device, the jaw being moveable between a retracted position, where the work may be placed in front of it, and advanced position, where it cooperates with the other jaw to clamp the article, a transfer finger moveable along the path of movement of said jaw between a position holding the article in said jaw as the jaw starts to advance the article and a retracted position where the article held by it is confined between both jaws, means to advance and retract said first named jaw, means urging said transfer finger toward its first named position, a latch holding said finger in retracted position and trip means operable to release the latch at about the time the first named jaw arrives at retracted position whereby to cause the finger to advance and hold an article in the jaw, said article directing means comprising a chute and said first named jaw being moveable across the bottom of said chute.

3. A chucking device including two jaws adapted to clamp articles such as tubes, rods, etc. therebetween means adjacent one of said jaws for directing articles to the device, the jaw being movable between a retracted position, where the work may be placed in front of it, and advanced position, where it cooperates with the other jaw to clamp the article, a transfer finger moveable along the path of movement of said jaw between a position holding the article in said jaw as the jaw starts to advance the article and a retracted position where the article held by it is confined between both jaws, means to advance and retract said first named jaw, means urging said transfer finger toward its first named position, a latch holding said finger in retracted position and trip means operable to release the latch at about the time the first named jaw arrives at retracted position whereby to cause the finger to advance and hold an article in the jaw, said transfer finger extending through the said other jaw, and said latch being positioned to hold the end of the finger in a position outwardly of the adjacent article engaging surface of said other jaw whereby the article is pressed away from said other jaw as the jaws separate.

4. A chucking device including two jaws adapted to clamp articles such as tubes, rods, etc. therebetween, means adjacent to one jaw for directing articles to the device, the jaw being movable between a retracted position where the work may be placed in front of it, and advanced position where it cooperates with the other jaw to clamp the article, a transfer finger movable along the path of movement of said first named jaw between a position holding the article in said jaw as the jaw starts to advance the article and a retracted position where the article held by it is confined between both jaws, means to advance and retract said first named jaw, means to advance said transfer finger to its first named position, means rendering said finger advancing means inoperative to advance the finger while the first named jaw is moving to retracted position and release means operable upon final movement of the first named jaw to retracted position, to again make the finger advancing means operative to advance the finger and hold an article in the jaw.

5. A chucking device including two jaws adapted to clamp articles such as tubes, rods, etc. therebetween, a chute above one jaw for directing articles to the device, the jaw being movable between a retracted position, where the work may be placed in front of it, and advanced position, where it cooperates with the other jaw to clamp the article, and provides an article support under the chute, a transfer finger movable along the path of movement of said first named jaw between a position holding the article in said jaw as the jaw starts to advance the article and a retracted position where the article held by it is confined between both jaws, means to advance and retract said first named jaw, means to advance said transfer finger to its first named position, means rendering said finger advancing means inoperative to advance the finger while the first named jaw is moving to retracted position and release means operable upon final movement of the first named jaw to retracted position, to again make the finger advancing means operative to advance the finger and hold an article in the jaw.

6. A chucking device including two jaws adapted to clamp articles such as tubes, rods, etc., therebetween, means adjacent to one jaw for directing articles to the device, the jaw being movable between a retracted position where the work may be placed in front of it, and advanced position where it cooperates with the other jaw to clamp the article, a transfer finger extending through the other jaw and movable along the path of movement of said first named jaw between a position holding the article in said jaw as the jaw starts to advance the article and a retracted position where the article held by it is confined between both jaws, means to advance and retract said first named jaw, means to advance said transfer finger to its first named position, means rendering said finger advancing means inoperative to advance the finger while the first named jaw is moving to retracted position, and release means operable upon final movement of the first named jaw to retracted position, to again make the finger advancing means operative to advance the finger and hold an article in the jaw.

BYRON F. BOWER.

REFERENCES CITED

The following references are of record in the file of this patent:

UNITED STATES PATENTS

| Number | Name | Date |
|---|---|---|
| 379,307 | Codling | Mar. 13, 1888 |
| 579,357 | Brown, Jr. | Mar. 23, 1897 |
| 1,252,929 | Muller | Jan. 8, 1918 |
| 1,581,022 | Saylor | Apr. 13, 1926 |
| 2,298,366 | Gladfelter et al. | Oct. 13, 1942 |
| 2,349,168 | Hill | May 16, 1944 |